(12) United States Patent
Tedesco et al.

(10) Patent No.: US 10,584,851 B2
(45) Date of Patent: Mar. 10, 2020

(54) MODULAR MULTIWAVELENGTH LIGHT SOURCE

(71) Applicants: John Joseph Tedesco, Holbrook, NY (US); Gerald T. Tedesco, Coram, NY (US); Charles Tedesco, East Patchogue, NY (US)

(72) Inventors: John Joseph Tedesco, Holbrook, NY (US); Gerald T. Tedesco, Coram, NY (US); Charles Tedesco, East Patchogue, NY (US)

( * ) Notice: Subject to any disclaimer, the term of this patent is extended or adjusted under 35 U.S.C. 154(b) by 0 days.

(21) Appl. No.: 16/103,547

(22) Filed: Aug. 14, 2018

(65) Prior Publication Data

US 2019/0316755 A1    Oct. 17, 2019

Related U.S. Application Data

(60) Provisional application No. 62/658,838, filed on Apr. 17, 2018.

(51) Int. Cl.
*F21V 9/08* (2018.01)
*F21V 7/22* (2018.01)
(Continued)

(52) U.S. Cl.
CPC .................. *F21V 9/08* (2013.01); *F21V 7/22* (2013.01); *F21V 13/04* (2013.01); *F21V 13/14* (2013.01);
(Continued)

(58) Field of Classification Search
CPC .......... F21V 9/08; F21V 29/60; F21V 23/003; F21V 29/503; F21V 13/04; F21V 7/22; F21V 9/20; F21V 9/00; F21V 21/005; F21Y 2115/10; F21Y 2113/13; G02B 27/141; G02B 27/145; G03B 21/2013; G03B 21/2066; F21K 9/237; H04N 9/3164
See application file for complete search history.

(56) References Cited

U.S. PATENT DOCUMENTS

5,065,005 A * 11/1991 Encaoua ............... G02B 27/141
                                                            250/206.2
5,636,919 A *  6/1997 Walker ................ F21V 19/0085
                                                            362/217.14
(Continued)

*Primary Examiner* — Peggy A Neils (57) ABSTRACT

A modular multiwavelength light source generates a highly cohesive beam of light from multiple light sources. The modular multiwavelength light source has a light-collating unit, a primary light source, and a secondary light source. The light-collating unit combines the light from the primary light source and the secondary light source into a single multiwavelength beam. The unit has a light-modification element a primary input coupler, a secondary input coupler and an output coupler which are in optical communication through the light-modification element. The primary input coupler and the secondary input coupler enable the primary light source and the secondary light source to be laterally mounted onto the light-collating unit and maintained in optical communication with the light-modification element. The primary input coupler and the secondary input coupler are angularly offset form each other. Thus, enabling the light-modification to redirect the light from the secondary light source toward the output coupler.

5 Claims, 6 Drawing Sheets

(51) Int. Cl.
  *F21V 13/04*    (2006.01)
  *F21V 29/503*   (2015.01)
  *F21V 23/00*    (2015.01)
  *F21V 29/60*    (2015.01)
  *F21V 13/14*    (2006.01)
  *F21V 17/00*    (2006.01)
  *F21V 23/02*    (2006.01)
  *F21Y 113/13*   (2016.01)
  *F21Y 115/10*   (2016.01)

(52) U.S. Cl.
  CPC .......... *F21V 17/002* (2013.01); *F21V 23/003* (2013.01); *F21V 23/02* (2013.01); *F21V 29/503* (2015.01); *F21V 29/60* (2015.01); *F21Y 2113/13* (2016.08); *F21Y 2115/10* (2016.08)

(56) References Cited

U.S. PATENT DOCUMENTS

| | | | | |
|---|---|---|---|---|
| 6,222,961 | B1* | 4/2001 | Engelhardt | G02B 21/002 359/368 |
| 8,308,301 | B2* | 11/2012 | Nagayoshi | G02B 27/104 353/31 |
| 8,562,150 | B2* | 10/2013 | Hashizume | H04N 9/3129 353/85 |
| 8,894,215 | B2* | 11/2014 | Miura | G02B 27/0905 353/38 |
| 9,876,999 | B2* | 1/2018 | Katou | H04N 9/3144 |
| 10,051,247 | B2* | 8/2018 | Nagashima | G02B 27/0101 |
| 2016/0170218 | A1* | 6/2016 | Johnson | G02B 6/29362 359/356 |
| 2019/0021583 | A1* | 1/2019 | Yoshida | F21V 29/51 |

\* cited by examiner

MODULAR MULTIWAVELENGTH LIGHT SOURCE

The current application claims a priority to the U.S. Provisional Patent application Ser. No. 62/658,838 filed on Apr. 17, 2018.

FIELD OF THE INVENTION

The present invention relates generally to a lighting system. More specifically, the present invention relates to a lighting system that combines two or more beams of light in order to generate a multiwavelength beam.

BACKGROUND OF THE INVENTION

Traditional general lighting systems produce beams of light with limited wavelengths for illumination. Because of the limited range of light produced, these systems, even under high intensity, can still make it difficult to discern objects and people at a distance. Reading signs, road markers, or seeing pedestrians can be quite challenging, especially at night or when environmental conditions turn harsh, such as rain and fog. Another issue that reduces object efficacy of traditional lighting systems is the use of bright lighting without providing sufficient control of the color temperature of the produced light. Cloudy skies or twilight lighting conditions are at extreme ends of the color temperature scale. Twilight is 12,000 degrees K and overcast skies are typically 6500 degrees Kelvin, Sunrise at 3000 degrees Kelvin and midnight at 0 degrees Kelvin. Contemporary vehicles and roadways are designed with brighter and more efficient lighting systems that illicit a significant response from the human eye. The light reflex of the human eye is constantly being tested and can be pushed to limits where temporary blindness may be the result from inadequate aversion response.

The present invention addresses these shortcomings by providing a system that enables a user to control various characteristics of a beam of light. These characteristics include, but are not limited to, light intensity, color temperature, and effective wavelength. This is accomplished through the use of a dichroic element used to increase spectral bandwidth. By expanding the range of possible wavelength of source lighting, the present invention increases visual perception of the objects being illuminated. Additionally, by using the present invention in a controlled lighting system, visual detail of objects is greatly enhanced, both reflective and luminescent objects will have greater visual clarity. This can be further enhanced by using spray on/paint on florescent paints, color or clear. Utilizing a prism-based light engine easily combines color temperatures (colors)/wavelengths, which are mixed or modulated and intensity adjusted. Any color temperature can be reproduced for use in advertising source lighting, decorative displays, environmental lighting systems, or handheld portable lighting such as, flashlights and other personal lighting.

The present invention, the modular multiwavelength light source, is a modular device that produces multiwavelength light beams that contain only user-selected wavelengths. This functionality enables the present invention to produce light that is tailored to specific situations. For example, the present invention can function as the headlights for land, air, and sea vehicles. Additionally, the present invention can be designed as a portable lighting device that can be used by search and rescue personnel, law enforcement personnel, and other members of the general population. Further, the present invention is designed to be used in permanent fixtures that include, but are not limited to, general outdoor lighting, street lighting (overhead highway and sign lighting), and parking lot flood lighting.

Preferably, the present invention is a broadband lighting system that utilizes both the visible and UV wavelengths of light. Further, the present invention is designed to produce multiwavelength beams that contain electromagnetic waves form all portions of the electromagnetic (EM) spectrum. The Visible light wavelength of the EM spectrum occupies a very narrow portion of the available bandwidth that could be used to enhance object visibility. This includes both the infrared and ultraviolet portions of the spectrum. Near Infrared (780 nm-2500 nm) is invisible to the human eye, but the shorter wavelength of the UV-a (395 nm-180 nm) will cause many objects to luminesce. The effect is known as black lighting. In one embodiment, the present invention uses multiple and extended wavelength LED technology produce desired light wavelengths. The present invention is designed to blend, merge, combine, and superimpose lights beams of varying wavelength. Thus, producing a coherent beam.

The present invention combines and modulates the electrical requirements of multiple light sources. Further, the present invention makes use of a prismatic optical block to produce a desired pattern and minimize microconvergence. Specifically, the present invention is an optical system that casts a bullseye-patterned beam of light. The present invention is designed to use multiple light-modification elements to combine multiple wavelengths, and dramatically increase the luminance intensity of the light provided by any number of optically-coupled light sources. While the normal spectral range of visible light is between 400 nm and 700 nm, the present invention is designed to function along a wide swath of the EM spectrum. Preferably the present invention operates within a range from 180 nm to 800 nm. This range enables the user to select the wavelengths required to illuminate aspects of objects that would otherwise remain invisible. For example, when a UV light wave hits an object containing substances known as phosphors, those phosphors will naturally fluoresce, and glow. This glow is created by the special way phosphors use the energy from UV light. When a photon from UV light hits the phosphorous material, it excites the electrons.

Preferably, the present invention makes use of a narrow UV wavelength (365-370 nm, 380 nm-385 nm) and visible light wavelength of 400 to 800 nm. Any visible portion of ultraviolet is minimized by using UV-A below 385 nm. Although, the UV-a portion of the present invention system can be run independently of the visible light portion, the UV portion is considered here to be a supplemental light source. The present invention can be coupled to a control system that changes the characteristics of produced light in response to environmental data.

Preferably the present invention uses an off-line power supply converter that outputs a bucked 40 VDC bus which is regulated voltage. Electrical power to be fed to 5 independent LED ballast modules. Each ballast module feeds a voltage and current regulated source to an individual COB LED module. These ballasts are current adjustable in order to change the intensity of the respectful LED module. There 5 independent cooling fans which are speed regulated based on temperature. There is a 9-lens system consisting of both planar convex and biconvex lenses to modify the shape and size of a produced beam. Additionally, a control interface accepts user inputs and controls power, light intensity for individual LED COBs as well as programmed color temperature, UV intensity and wavelength and mixing percentage. A display gives pertinent data related to voltage, current, and power usage.

DETAIL DESCRIPTIONS OF THE INVENTION

All illustrations of the drawings are for the purpose of describing selected versions of the present invention and are not intended to limit the scope of the present invention.

In reference to FIG. 1 through FIG. 6, the present invention, a modular multiwavelength light source comprising, is a device that uses multiple light-directing modules to merge light that is generated by multiple light sources into a single high-intensity multiwavelength beam. Each of these modules are serially connected, and function as additive devices that serve to further modify the quality of the multiwavelength beam. By selectively choosing the light sources, a user of the present invention is able to generate a light beam that contains only desirable characteristics. For example, if the user wants to create a light beam that contains only red, green, and blue light, then the user will select a light source that only generates red light, a light source that only generates green light, and a light source that only generates blue light. Each of these light sources will be optically coupled to the light-directing modules and used to form the multiwavelength beam. Specifically, the present invention will combine the red light, the green light, and the blue light into a single collated beam that contains only the light generated by the three light sources. The modular aspect of the present invention enables a user to further modify the characteristics of the multiwavelength beam by adding one or more light-directing modules to the serial chain of light-directing modules.

As described above, the present invention is designed to generate a highly tunable beam of collated light. To facilitate this functionality, the present invention comprises at least one light-collating unit 1, at least one primary light source 2 and at least one secondary light source 3. The light-collating unit 1 is a device that redirects two or more angularly offset beams of light to form a single multiwavelength light beam that travels along an output axis 4. To accomplish this, the light-collating unit 1 comprises at least one light-modification element 11, at least one primary input coupler 12, at least one secondary input coupler 13, and at least one output coupler 14. The light-modification element 11 is a device used to refract a secondary light beam 31 generated by the secondary light source 3, such that the secondary light beam 31 is redirected to along the output axis 4. Additionally, the light-modification element 11 is designed to enable a primary light beam 21 generated by the primary light source 2 to traverse the light-modification element 11 without being modified. Preferably the light-modification element 11 makes use of a dichroic glass to redirect the secondary light beam 31 along the output axis 4. Alternatively, the light-modification element 11 can replace the dichroic glass with various light-refracting devices including, but not limited to, prisms, lenses, and mirrors.

The primary input coupler 12, the secondary input coupler 13, and the output coupler 14 are connection mechanisms that enable a plurality of external components to be mounted onto the light-modification element 11 while being retained in optical communication with the light-modification element 11. Additionally, the primary input coupler 12 is laterally integrated into the light-modification element 11. Similarly, the secondary input coupler 13 is laterally integrated into the light-modification element 11. Further, the secondary input coupler 13 is angularly offset from the primary input coupler 12 across the light-modification element 11. As a result, the secondary input coupler 13 is positioned to enable the secondary light beam 31 to be refracted by the light-modification element 11. Thus, redirecting the secondary light beam 31 along the output axis 4. The output coupler 14 is laterally integrated into the light-modification element 11. Additionally, the output coupler 14 is angularly offset from the primary input coupler 12 across the light-modification element 11. As a result, the output coupler 14 is positioned such that the primary beam of light is able to pass through the primary input coupler 12, the light-modification element 11, and the output coupler 14. Preferably, the primary input coupler 12 is concentrically aligned to the output coupler 14. Accordingly, the primary light beam 21 travels in a straight line along the output axis 4 when traversing into the primary input coupler 12, through the light-modification element 11, and out of the output coupler 14.

As described above, the light-collating unit 1 merges the light beams from multiple light sources into a single multiwavelength beam. To that end, the primary light source 2 and the secondary light source 3 act as input devices which direct light into the light-collating unit 1. Specifically, the primary light source 2 is optically coupled to the primary input coupler 12. Accordingly, the primary light source 2 generates the primary light beam 21 which traverses into the primary input coupler 12, through the light-modification element 11, and out of the output coupler 14. Additionally, the primary light source 2 can be directly mounted onto the primary input coupler 12. Alternatively, the primary light source 2 can be optically coupled to the primary input coupler 12 via an intervening waveguide or light-directing apparatus. Similarly, the secondary light source 3 is optically coupled to the secondary input coupler 13. Accordingly, the secondary light source 3 generates the secondary light beam 31 which traverses into the secondary input coupler 13, is refracted by the light-modification element 11 such that the secondary light beam 31 travels along the output axis 4, and then traverses out of the output coupler 14. Additionally, the secondary light source 3 can be directly mounted onto the secondary input coupler 13. Alternatively, the secondary light source 3 can be optically coupled to the secondary input coupler 13 via an intervening waveguide or light-directing apparatus. The primary light source 2 and the secondary light source 3 are in optical communication with the output coupler 14 through the light-modification element 11. Consequently, light that enters the light-collating unit 1 through the primary input coupler 12 and the secondary input coupler 13 must travel through the light-modification element 11 before exiting the light-collating unit 1. Preferably, the primary input coupler 12, the secondary input coupler 13, and the output coupler 14 are the only access points for light to enter the light-collating unit 1. A one-way filter may be integrated into the output coupler 14 so that light is permitted to exit the light-modification element 11 through the output coupler 14 and prevented from entering the light-modification element 11 through the output coupler 14. Similarly, one-way filters may be integrated into the primary input coupler 12 and the secondary output coupler 14. These one-way filters permit light to enter the light-modification element 11 and prevent light from exiting the light-modification element 11 through the primary input coupler 12, the secondary input coupler 13.

As described above, the light-modification element 11 is designed to redirect the secondary light beam 31 along the output axis 4 without refracting the primary light beam 21. To that end, the light-modification element 11 comprises an element housing 111 and at least one dichroic panel 112. The dichroic panel 112 is mounted within an interior compartment 113 of the element housing 111. Additionally, the dichroic panel 112 is configured to redirect light received through the secondary input coupler 13 toward the output coupler 14. Thus configured, the dichroic panel 112 acts as a reflector for the secondary light beam 31. Specifically, secondary input coupler 13 is configured to let the secondary light beam 31 enter the element housing 111 with a heading that is angularly offset from the output axis 4. The dichroic panel 112 is configured to redirect the secondary light beam 31 toward the output coupler 14, along a heading that is colinear to the output axis 4. The primary input coupler 12 is in optical communication with the output coupler 14 through the dichroic panel 112. Accordingly, the dichroic panel 112 can be positioned to facilitate redirection the secondary light beam 31 without taking a heading of the primary light beam 21 into consideration. In an alternative embodiment at least one primary dichroic panel 112 is mounted within the interior compartment 113. This primary dichroic panel 112 is configured to redirect the primary light beam 21 toward the output coupler 14, along a heading that is colinear to the output axis 4. The output coupler 14 blends the primary light beam 21 and the secondary light beam 31 into a multiwavelength beam. Additionally, the output axis 4 of the multiwavelength beam is directed away from the light-modification element 11. As a result, the light generated by the primary light source 2 and the secondary light source 3 is combined to form the multiwavelength beam, which has user-selected characteristics.

The primary input coupler 12, the secondary input coupler 13, and the output coupler 14 are designed to let light travel through the element housing 111. To that end, the primary input coupler 12 is a primary aperture 121, the secondary input coupler 13 is a secondary aperture 131, and the output coupler 14 is an output aperture 141. That is, the primary input coupler 12, the secondary input coupler 13, and the output coupler 14 are coupling mechanisms that enable the external components to be mounted onto the light-modification element 11 while being retained in optical communication with the light-modification element 11. Further, the primary aperture 121, the secondary aperture 131, and the output aperture 141 traverse through the element housing 111 and into the interior compartment 113. Consequently, the primary aperture 121, the secondary aperture 131, and the output aperture 141 form the only access points for light to enter or exit the light-modification element 11. Thus, enabling the present invention to produce multiwavelength beams that contain only user-selected wavelengths.

The light-collating unit 1 is designed to combine light from multiple sources into a single highly-tuned beam. To accomplish this, the at least one secondary input coupler 13 is a plurality of secondary input couplers 13. Additionally, the at least one secondary light source 3 is a plurality of secondary light sources 3. What's more, the at least one dichroic panel 112 is a plurality of dichroic panels 112. The plurality of secondary input couplers 13 is distributed across the light-modification element 11 so that the plurality of secondary light sources 3 can be mounted onto the light-collating unit 1. Further, each of the plurality of dichroic panels 112 is configured to redirect light received through a corresponding secondary coupler toward the output coupler 14. The corresponding secondary coupler is from the plurality of secondary input couplers 13. Thus configured, the plurality of dichroic panels 112 enables multiple secondary light beams 31 to be refracted and added to the multiwavelength beam. Specifically, each of the plurality of dichroic panels 112 is aligned to the corresponding secondary coupler such that light traversing through the corresponding secondary coupler is redirected from a heading that is angularly offset to the output axis 4, to a heading that is colinear to the output axis 4. Additionally, each of the plurality of secondary light sources 3 is optically coupled to the corresponding secondary coupler. Accordingly, the secondary light beam 31 produced by each of the secondary light sources 3 traverses the corresponding secondary coupler and is redirected by the dichroic panel 112 that is aligned to the corresponding panel. As a result, the secondary light beam 31 generated by each of the plurality of secondary light sources 3 is redirected along the output axis 4 and traverses though the remaining plurality of dichroic panels 112. Thus, each of the secondary light beams 31 is added to the multiwavelength beam that exits the light-collating unit 1 through the output coupler 14. Preferably, any beam of light traveling along the output axis 4 is able to travers through each of the plurality of dichroic panels 112 unhindered.

The present invention is designed to produce collated and beams of light that contain only user-selected characteristics. To facilitate this, the present invention further comprises at least one lens 5. The lens 5 is mounted onto the output coupler 14. Additionally, the lens 5 is in optical communication with the output coupler 14. Accordingly, the lens 5 is used to modify the multiwavelength beam. Various lenses 5 can be mounted onto the output coupler 14 to perform light-modification functions that include, but are not limited to, refracting, collating, focusing, and dispersing.

Figure 1:
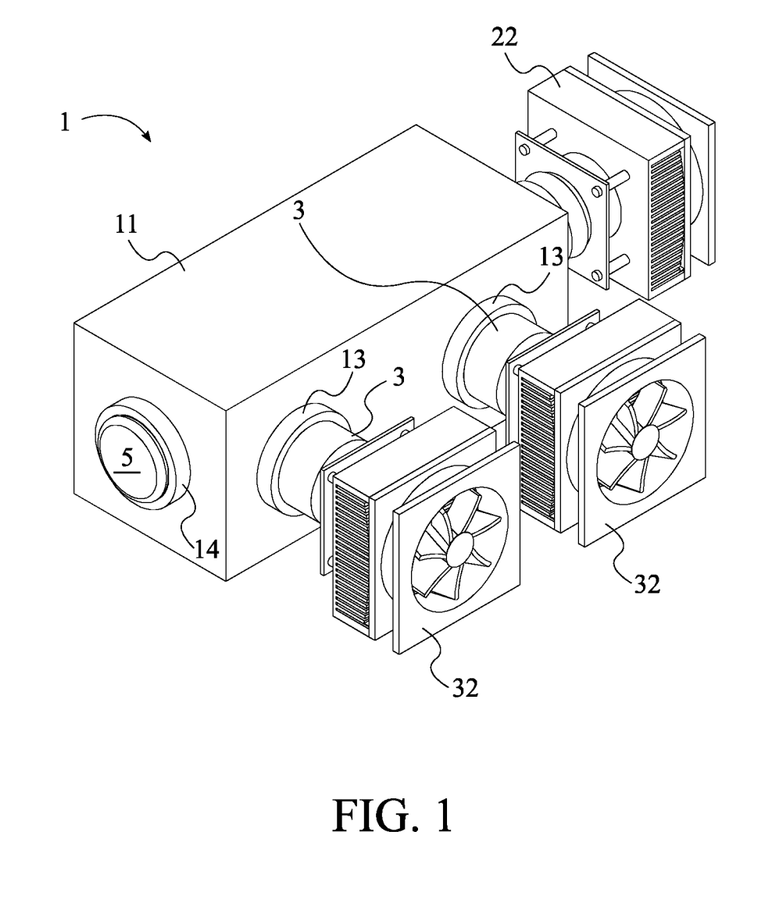
FIG. 1 is a perspective view of the present invention.
Figure 2:
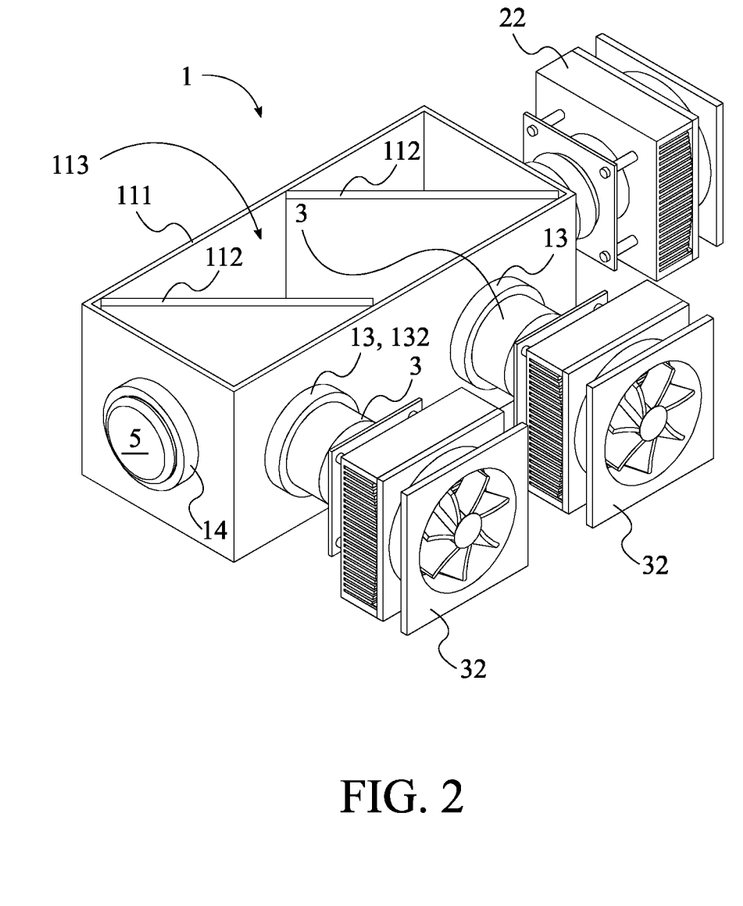
FIG. 2 is a perspective view of the present invention with a top surface of the light-modification unit removed.
Figure 3:
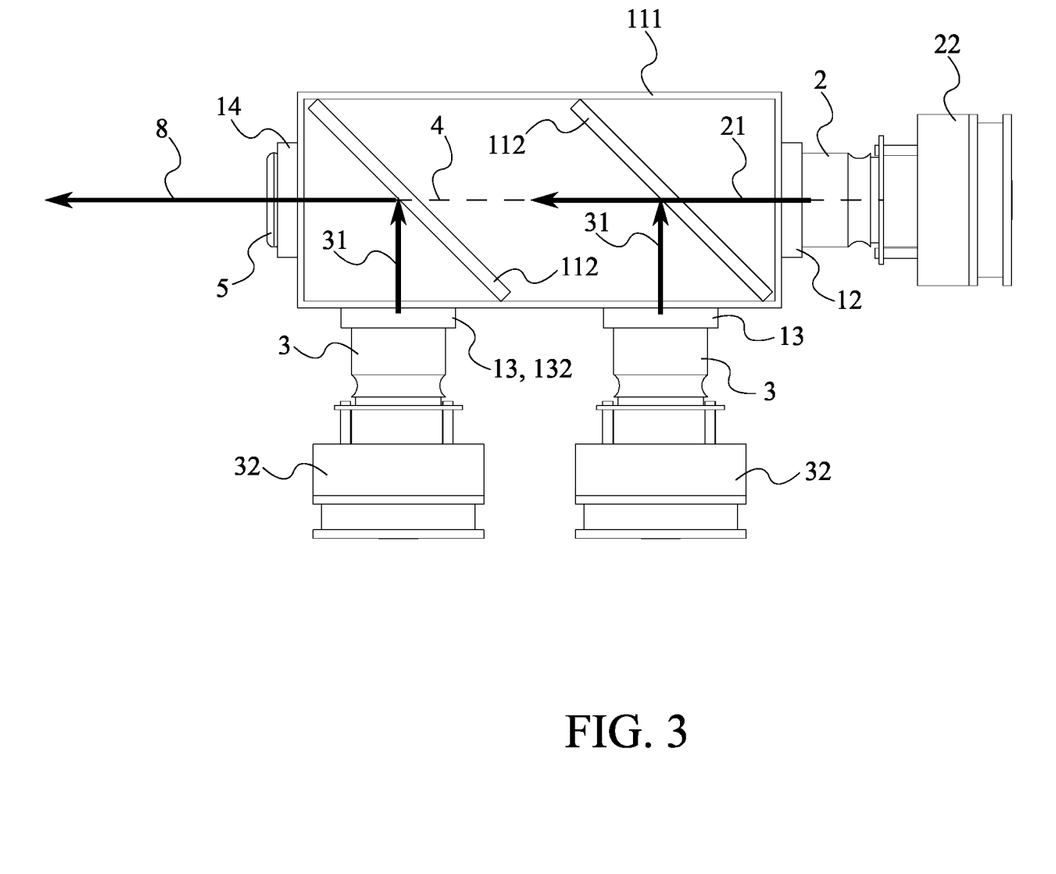
FIG. 3 is a top view of the present invention with a top surface of the light-modification unit removed.
Figure 4:
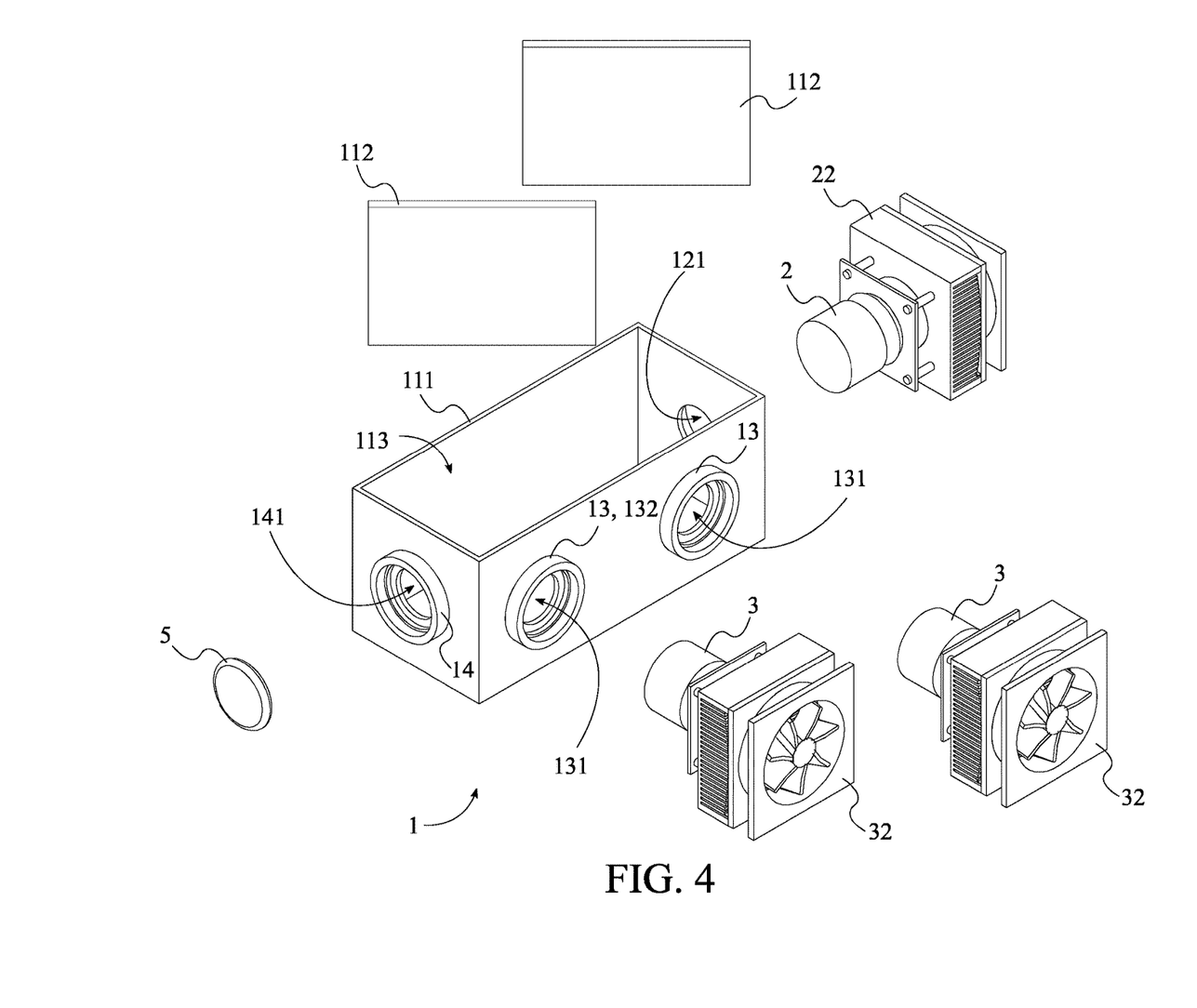
FIG. 4 is an exploded perspective view of the present invention with a top surface of the light-modification unit removed.
Figure 5:
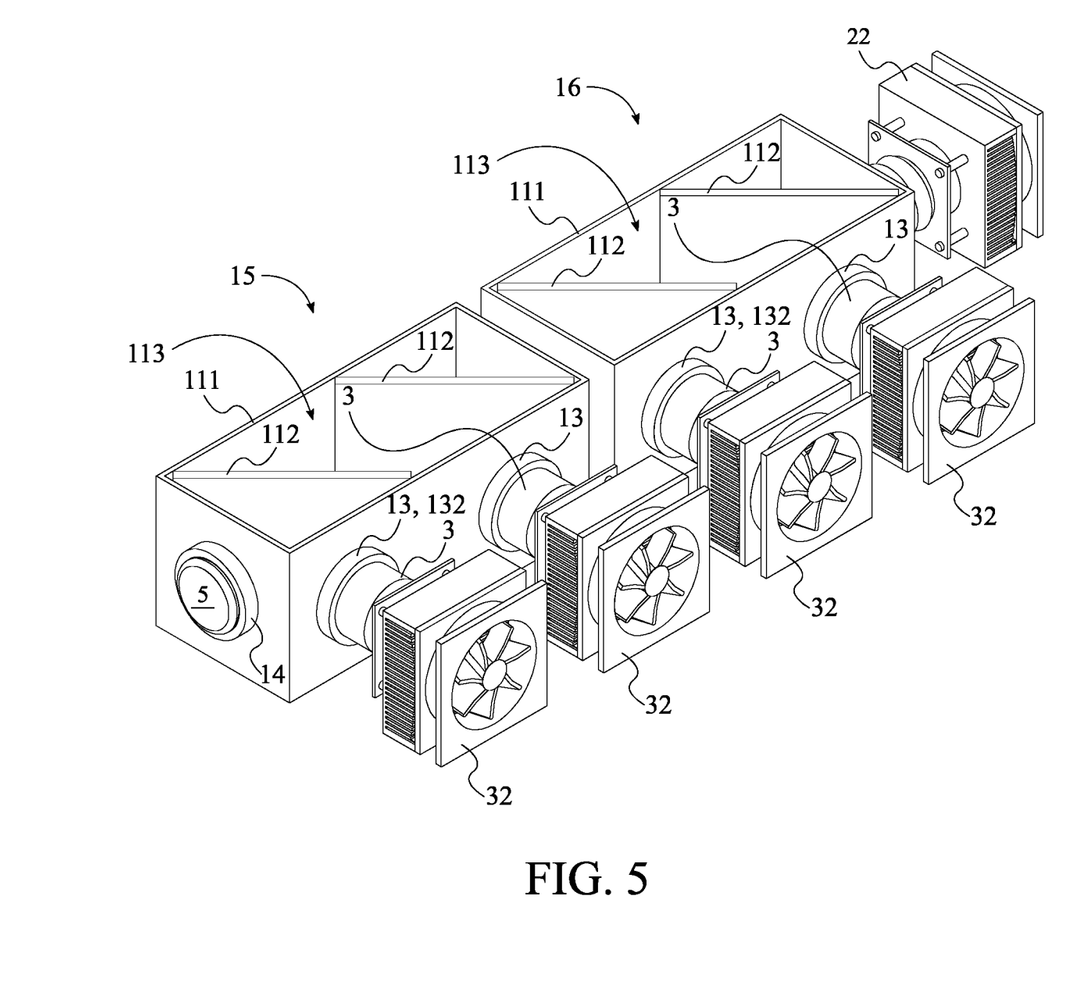
FIG. 5 is a perspective view of a plurality of serially attached light-collating units found in the present invention. In this view a top surface of the light-modification unit is removed.

As described above, the present invention is designed to be a modular system that enables multiple light-collating units 1 to be serially connected when producing the multiwavelength beam. In this instance, the at least one light-collating unit 1 is a plurality of light-collating units 1. Additionally, the plurality of light-collating units 1 comprises an arbitrary unit 15 and an adjacent unit 16. These elements can be connected to produce a multiwavelength beam of light that is a composite of the multiwavelength beam produced by each of the plurality of light-collating units 1. When connecting the plurality of light-collating units 1, the primary input coupler 12 of the arbitrary unit 15 is mounted onto the output coupler 14 of the adjacent unit 16. Additionally, the primary input coupler 12 of the arbitrary unit 15 is in optical communication with the output coupler 14 of the adjacent unit 16. Consequently, the plurality of light-collating units 1 can be connected end-to-end in a manner that enables light to travel through the chain of serially connected light-collating units 1. Further, this configuration enables the multiwavelength beam produced by the adjacent unit 16 to act as the primary light beam 21 for the arbitrary unit 15. The adjacent unit 16 is positioned in between the arbitrary unit 15 and the primary light source 2. Thus positioned, the primary light source 2 produces the primary light beam 21 that enters the primary input coupler 12 of the adjacent unit 16 that is first in the serial chain of light-collating units 1. Further, the multiwavelength beam produced by the adjacent unit 16 functions as the primary light beam 21 for the arbitrary unit 15. In a first alternative embodiment the at least one lens 5 is a plurality of lenses 5. In this embodiment, each of the lenses 5 is mounted in between one or more of the serially connected light-collating units 1.

Figure 6:
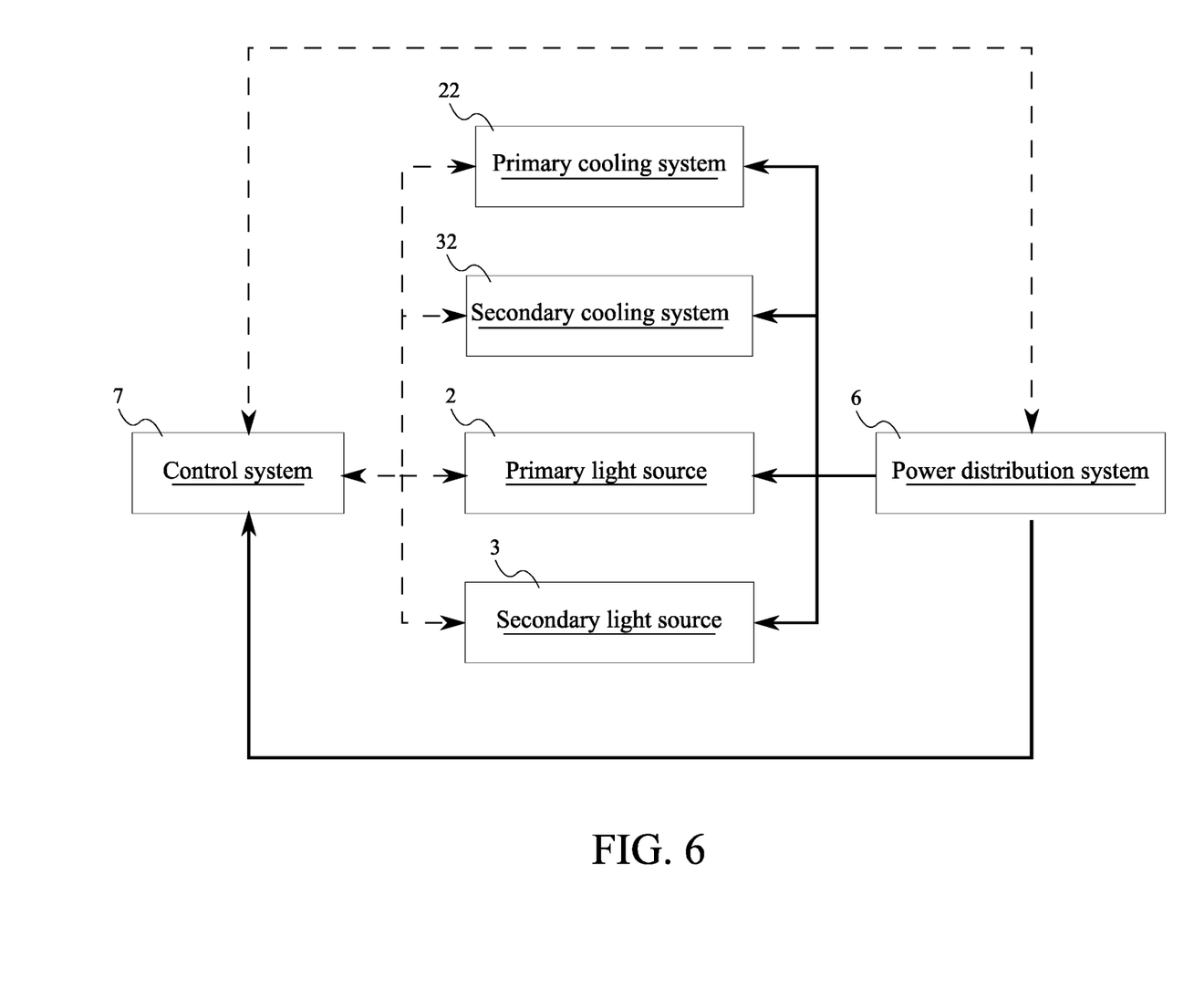
FIG. 6 is a block diagram with dashed lines indicating electrical communication between the components of the present invention.

The present invention is designed to function as a light-production unit that makes use of an electronic cooling and control system. Specifically, the present invention further comprises at least one primary cooling system 22, at least one secondary cooling system, a control system 7, and a power distribution system 6. The primary cooling system 22 and the secondary cooling system can be designed using cooling devices that include, but are not limited to fans, heat sinks, and liquid cooling systems. The primary cooling system 22 is thermally coupled to the primary light source 2. Similarly, the secondary cooling system is thermally coupled to the secondary light source 3. As a result, the primary cooling system 22 and the secondary cooling system prevent the primary light source 2 and the secondary light source 3 from overheating. The power distribution system 6 is designed to provide the necessary electrical power required to operate the electronic components of the present invention. Specifically, the power distribution system 6 is electrically connected to the at least one primary light source 2 and the at least one secondary light source 3. Further, the power distribution system 6 is electrically connected to the control system 7, the primary cooling system 22, and the secondary cooling system. Preferably, the power distribution system 6 includes a power source and power conditioning components. Accordingly, the power distribution system 6 prevents the electronic components from being damaged by electrical faults. The control system 7 is electronically connected to the at least one primary light source 2 and the at least one secondary light source 3. Further, the control system 7 is electronically connected to the control system 7, the primary cooling system 22, and the secondary cooling system. Accordingly, the user is able to govern the operation of the electrical components of the present invention by entering commands into the control system 7. Preferably, the control system 7 includes a microcontroller and a user input device. The microcontroller is tasked with interpreting commands received through the user input device and then issuing commands which direct the appropriate electrical component to execute the user-issued command. Preferably the control system 7 can be communicably coupled to an external system. Thus coupled, the external system can issue remote commands.

Although the invention has been explained in relation to its preferred embodiment, it is to be understood that many other possible modifications and variations can be made without departing from the spirit and scope of the invention as hereinafter claimed.

What is claimed is:

1. A modular multiwavelength light source comprising:
   a primary light source;
   a plurality of light-collating units;
   an output lens;
   a primary cooling system;
   at least one intermediate lens;
   the plurality of light-collating units being connected in between the primary light source and the output lens;
   the primary cooling system being thermally coupled to the primary light source;
   each of the plurality of light-collating units comprising an element housing, an interior compartment, a dichroic panel, a primary input coupler, a secondary input coupler, an output coupler, a secondary light source, a secondary cooling system, the interior compartment being formed within the element housing, the dichroic panel being mounted within the interior compartment, the primary input coupler being laterally integrated into the element housing, the secondary input coupler being laterally integrated into the element housing, the secondary input coupler being angularly offset from the primary input coupler across the element housing, the output coupler being laterally integrated into the element housing, the output coupler being oppositely positioned to the primary input coupler across the element housing, the secondary light source being optically coupled to the secondary input coupler, the secondary cooling system being thermally coupled to the secondary light source, the dichroic panel being configured to redirect light received from the secondary light source through the secondary input coupler toward the output coupler, the primary input coupler being in optical communication with the output coupler through the dichroic panel;
   the primary light source being optically coupled to the primary input coupler of a terminal light-collating unit among the plurality of light-collating units;
   the output lens being mounted onto and in optical communication with the output coupler of another terminal light-collating unit among the plurality of light-collating units;
   the output coupler of one of two adjacent light-collating units among the plurality of light-collating units and the primary input coupler of the other of the two adjacent light-collating units among the plurality of light-collating units being mounted onto and in optical communication with each other via a corresponding intermediate lens among the at least one intermediate lens;
   the primary light source generating a primary light beam;
   the secondary light source of each of the plurality of light-collating units generating a secondary light beam;
   the output lens blending the primary light beam and the plurality of secondary light beams into a multiwavelength beam; and
   an output axis of the multiwavelength beam being directed away from the plurality of light-collating units.

2. The modular multiwavelength light source as claimed in claim 1 comprising:
   the primary input coupler being a primary aperture;
   the secondary input coupler being a secondary aperture;
   the output coupler being an output aperture; and
   the primary aperture, the secondary aperture and the output aperture traversing through the element housing and into the interior compartment.

3. The modular multiwavelength light source as claimed in claim 1 comprising:
   each of the plurality of light-collating units comprising another dichroic panel, another secondary input coupler, another secondary light source, another secondary cooling system, the another secondary input coupler being laterally integrated into the element housing, the another secondary input coupler being angularly offset from the primary input coupler across the element housing, the secondary input coupler and the another secondary input coupler being distributed across the element housing, the another secondary light source being optically coupled to the another secondary input coupler, the another secondary cooling system being thermally coupled to the another secondary light source, the another dichroic panel being configured to redirect light received from the another secondary light source through the another secondary input coupler toward the output coupler, the primary input coupler being in optical communication with the output coupler through the another dichroic panel.

4. The modular multiwavelength light source as claimed in claim 1 comprising:

a control system; and the control system being electronically connected to the primary light source and the secondary light sources.

5. The modular multiwavelength light source as claimed in claim 1 comprising:

a power distribution system; and the power distribution system being electrically connected to the primary light source and the secondary light sources.

* * * * *